United States Patent
Christine et al.

(12) 
(10) Patent No.: US 6,496,233 B1
(45) Date of Patent: Dec. 17, 2002

(54) COMMAND AND CONTROL ARCHITECTURE FOR A VIDEO DECODER AND AN AUDIO DECODER

(75) Inventors: Charles Christine, Hamilton, NJ (US); Renata Trafidlo, Munich (DE)

(73) Assignees: Sarnoff Corporation, Princeton, NJ (US); Motorola Inc., Schaumburg, IL (US)

(*) Notice: Subject to any disclaimer, the term of this patent is extended or adjusted under 35 U.S.C. 154(b) by 0 days.

(21) Appl. No.: 09/449,893

(22) Filed: Nov. 30, 1999

Related U.S. Application Data

(60) Provisional application No. 60/114,835, filed on Jan. 6, 1999.

(51) Int. Cl.[7] .................................................. H04N 7/18
(52) U.S. Cl. ............................ 348/845.1; 375/240.28; 348/462
(58) Field of Search ..................... 375/240.25–240.29; 348/463–467, 714–720, 845.1–845.3

(56) References Cited

U.S. PATENT DOCUMENTS

| | | | | |
|---|---|---|---|---|
| 5,684,804 A | * | 11/1997 | Baronetti et al. | 370/509 |
| 5,828,416 A | * | 10/1998 | Ryan | 348/512 |
| 6,041,400 A | * | 3/2000 | Ozcelik et al. | 712/20 |
| 6,272,153 B1 | * | 8/2001 | Huang et al. | 370/304 |
| 6,311,161 B1 | * | 10/2001 | Anderson et al. | 704/212 |

\* cited by examiner

*Primary Examiner*—Andy Rao
(74) *Attorney, Agent, or Firm*—W. J. Burke

(57) ABSTRACT

A method and apparatus for using an interface and concomitant communication protocol to allow a video decoder to communicate with an audio decoder. More specifically, an interface structure having a status interface line and at least two data interface lines are employed between a video decoder and an audio decoder. The interface structure allows a communication protocol to effect communication of control information and data transmission, e.g., audio and timing data.

17 Claims, 4 Drawing Sheets

COMMAND AND CONTROL ARCHITECTURE FOR A VIDEO DECODER AND AN AUDIO DECODER

This application claims the benefit of U.S. Provisional Application No. 60/114,835 filed on Jan. 6, 1999, which is herein incorporated by reference.

The invention relates to an apparatus and concomitant method for controlling and monitoring a decoder system. More specifically, the present invention incorporates an interface structure having a status interface line and a plurality of data interface lines and concomitant communication protocol to allow a video decoder to communicate with an audio decoder.

BACKGROUND OF THE DISCLOSURE

The proliferation of digital video/audio information presents a challenge for systems that are tasked with receiving and decoding such complex information. Namely, digital information, e.g., a movie or a "live" broadcast from a digital studio or from a storage device, is often converted into compressed bitstreams before being transmitted or stored. The compressed bitstreams contain various data elements that include video, audio, timing, program specific information and control data which are packaged into various "packets". A packet is a group of binary digits that include various data elements that are switched and transmitted as a composite whole.

In turn, a decoding system must receive and decode the packets properly to extract the digital video/audio information. The data elements and other information are arranged in accordance with various specific formats, e.g., ISO/IEC international Standards 11172-* (Moving Picture Experts Group (MPEG-1)), 13818-* (MPEG-2), MPEG-4, American Television Standards Committee (ATSC) standards and Digital Video Broadcasting (DVB) specification prETS 300-468 are just several examples.

To illustrate, in general, MPEG defines a packet as consisting of a header followed by a number of contiguous bytes from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs that are assembled into a transport stream. The transport stream is then transmitted over a channel with a particular transfer rate.

As the transmission bandwidth increases in response to greater demand, it becomes increasingly more difficult to decode such an enormous amount of transmitted information, especially in real-time by a single decoder. As such, it is desirable that the decoding function be allocated such that two or more decoders can be employed to perform the decoding function, e.g., a video decoder to handle image information and an audio decoder to handle audio information. However, since the various components of the digital video/audio information, e.g., a video sequence and its associated audio frames, are closely related, the decoders must carefully coordinate their decoding functions to properly address numerous decoding and presentation issues, e.g., timing issues, lost information, servicing user selections, and the like. In fact, as the complexity of the digital video/audio information increases, the decoding system may employ a separate controller or a host to monitor the functions performed by the decoders, e.g., to arbitrate conflicts between the decoders.

Therefore, a need exists in the art for a method and apparatus for effecting communication between components within a decoding system. Specifically, a need exists for an interface and concomitant communication protocol to allow a video decoder to communicate with an audio decoder.

SUMMARY OF THE INVENTION

The present invention is a method and apparatus for using an interface structure having a status interface line and a plurality of data interface lines and concomitant communication protocol to allow a video decoder to communicate with an audio decoder. More specifically, the present interface structure allows multiple data streams to be passed between the two decoders by using control data or meta-data on the status interface line to inform the decoders as to which data interface lines are currently carrying relevant data that the receiving decoder should service.

The novel interface structure allows a communication protocol to effect communication of timing information and audio data transmission without having to add extra control data onto the data streams or to adhere to a strict time schedule as to which data interface line is actually carrying relevant data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
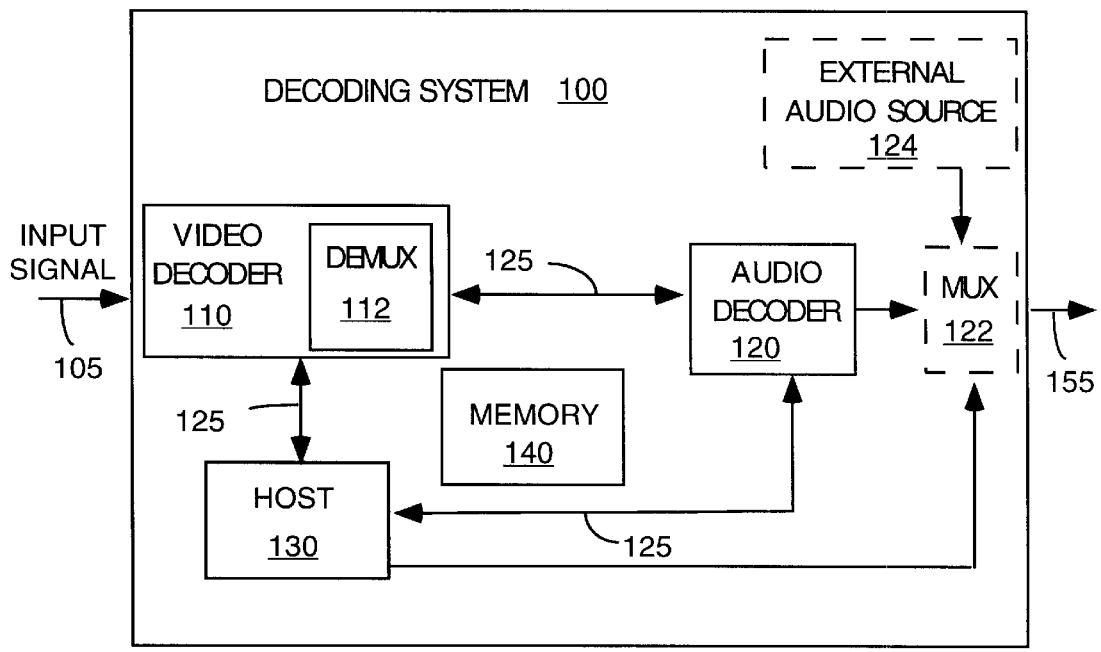
FIG. 1 depicts a block diagram of a decoding system of the present invention.

FIG. 1 illustrates a block diagram of a decoding system 100 of the present invention. The decoding system 100 of the present invention can be implemented within another larger system, e.g., a receiver or a set top box.

The decoding system 100 comprises a video decoder 110, an audio decoder 120, a controller or host 130 and a memory 140. In operation, an input signal is received by the decoding system 110 on path 105. The input signal can be a broadcasted input signal, e.g., a program broadcasted from a transmitter, or an input signal retrieved from a storage device, e.g., from a video disk or tape. The decoding system 100 decodes the input signal and produces one or more decoded signals, e.g., a decoded video signal and a decoded audio signal on path 155.

Furthermore, for the purpose of describing the present invention, it is presumed that the input signal includes both audio and video components that are in the format of "transport packets". However, if the input signal is in another format, e.g., having undergone additional encoding (e.g., channel encoding), then it is presumed that a preprocessing section (not shown) has performed the necessary complementary channel decoding on the input signal. Alternatively, it is also possible to incorporate such channel decoding capabilities into the video decoder 110.

The present invention is described below with reference to an input signal that is carrying an MPEG or ATSC compliant bitstream. As such, a brief description is provided here concerning the relationship between the data and timing information that form a significant portion of the bitstream. However, although the present invention is described below with respect to MPEG or ATSC compliant bitstreams, it should be understood that the present invention can be adapted to bitstreams in accordance with other formats.

More specifically, ATSC compliant Program Elementary Streams (PESs) carry system time clock information along with payload information. For ATSC audio data, the payload is generally AC/3 data or AC/3 related metadata. The system time clock information passed in the PES stream consists of a Decode Time Stamp (DTS) (optional) and a Presentation Time Stamp (PTS) (optional). In the absence of a DTS, the decoder may use the PTS to determine the DTS. In the absence of a PTS, the PTS of a previous PES packet may be used with the knowledge of the length of the data contained within the PES packet to reconstruct the PTS for the packet.

To use the PTS/DTS information contained within a given PES stream, the ATSC compliant decoder must have access to the System Time Clock (STC) for the system. In addition, any PCR discontinuities, which are passed in the transport stream of the ATSC compliant stream, must be communicated throughout the system. Since this information is passed in the ATSC transport stream and not within the PES streams, this data must be handled separately from the PES data.

FIG. 1 illustrates a memory 140 that can be employed to store and retrieve data, command, messages, and/or software instructions or programs as discussed below. Although a single memory 140 is illustrated, it should be understood that one or more memories can be employed within the decoding system, e.g., a dedicated memory can be implemented for each of the decoders and host.

In the preferred embodiment, the host 130 is implemented using a processor (e.g., PPC821 from Motorola of Schaumburg, Ill.), which serves as a high level controller for initializing, controlling, synchronizing and/or providing various user level functionalities for a decoding system which may include the audio decoder 120 and the video decoder 110. However, it should be understood that other processors can be employed as the host of the present invention.

The audio decoder 120 is an audio decoder that is capable of decoding audio information that is encoded in one or more formats, e.g., MPEG and ATSC. For example, the audio decoder 120 is an ATSC compliant audio decoder that is capable of decoding Program Elementary Streams (PES) level Audio Compression (AC/3) data into a PCM audio output. In the preferred embodiment, the audio decoder is implemented using a digital signal processor, e.g., the 56009 DSP chip or the 56362 DSP chip from Motorola, for performing audio decoding.

The video decoder 110 is a video decoder that is capable of decoding video information that is encoded in one or more formats, e.g., MPEG and ATSC. For example, video decoder 110 can be an MPEG or ATSC compliant video decoder. In the preferred embodiment, the video decoder 110 is implemented as a custom Application Specific Integrated Circuits (ASIC) that is capable of decoding MPEG 2 video data and routing transport payloads based upon Packet Identifliers (PIDs).

In the preferred embodiment, the video decoder 110 incorporates a demultiplexor (DEMUX) 112 for de-multiplexing at least two PES streams to the audio decoder 120 from the transport stream (input signal) that is received on path 105. Although the present invention discloses an interface 125 that is capable of handling at least two PES streams, it should be understood that the present invention can be adapted to any number of PES streams in the input signal to be passed between the video decoder and audio decoder.

Optionally, the decoding system may incorporate a multiplexor (MUX) 122 that accepts input from the audio decoder 120 and an external audio source 124, e.g., a storage device or from a communication channel. The purpose of the multiplexor is to optionally allow other audio sources to be selectively presented, e.g., a sampled version of an NTSC audio signal. The operation of the multiplexor is controlled by the host 130.

The host 130 is coupled to the audio decoder 120 via a bi-directional serial interface 125. This interface is dedicated to the transmission and reception of command, status messages and audio data between the host and the audio decoder. In the preferred embodiment, this interface can either emulate as a Phillips Inter-Integrated-Circuit Control ($I^2C$) or a Motorola Serial Peripheral Interface (SPI). Since the present invention employs a Motorola host processor as a controller, the SPI interface is implemented in the present communications protocol.

In turn, the host 130 is coupled to the video decoder 110 via a bi-directional serial interface 125. This interface is dedicated to the transmission and reception of command, status messages and video data between the host and the video decoder.

In turn, the video decoder 110 is coupled to the audio decoder 120 via a serial interface 125 and is described below with reference to FIG. 5. This interface is dedicated to the transmission and reception of command, status messages and audio data, e.g., PES streams, between the video decoder and the audio decoder.

In the preferred embodiment, data interface portion of the overall serial interface structure 125 is a Motorola serial interface. Although a Motorola data interface is employed in the present invention, it should be understood that other serial data interface can be adapted into the serial interface structure 125 of the present invention to provide the various functionalities that are described below.

Figure 2:
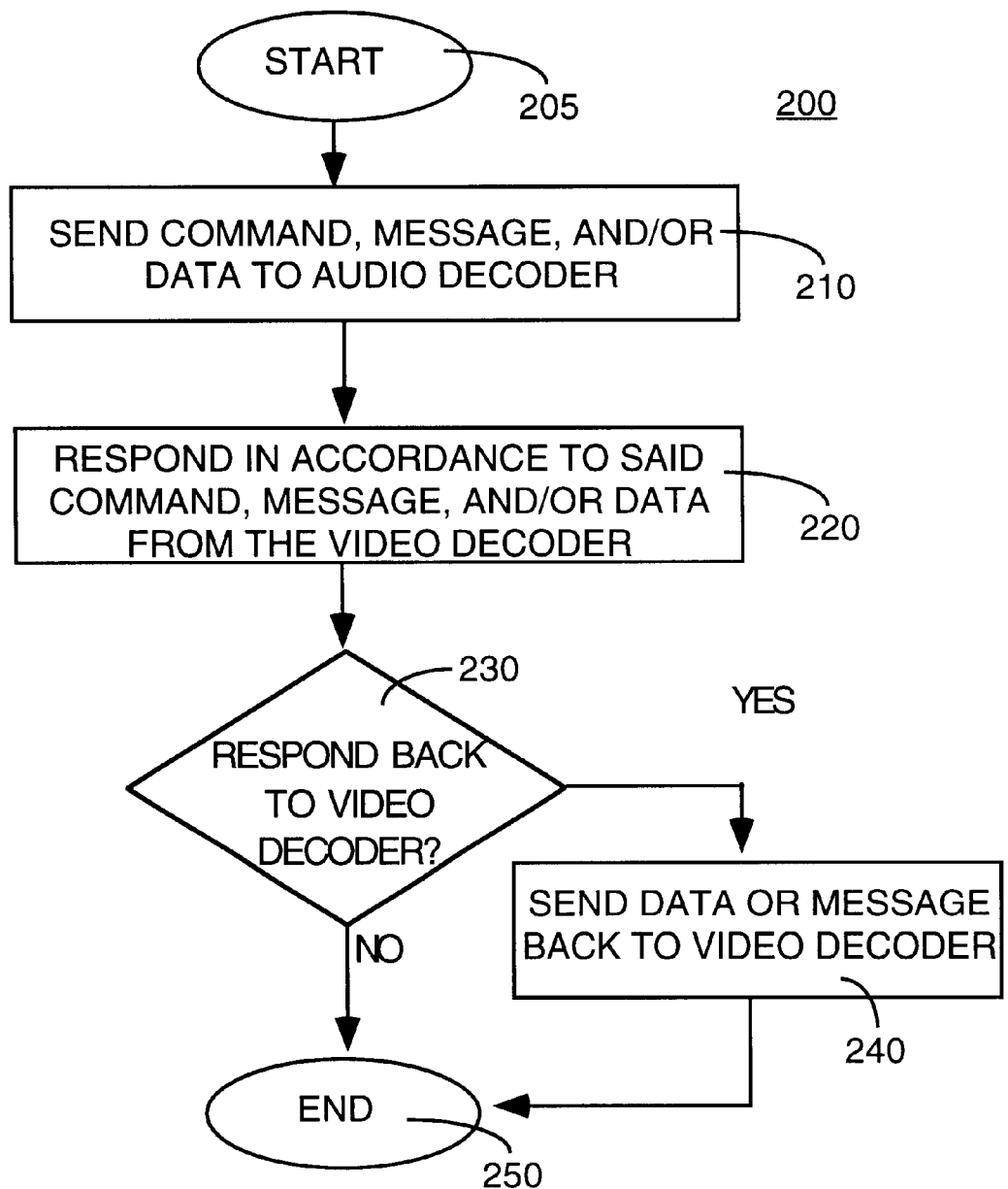
FIG. 2 depicts a flow chart for a method of using an interface to allow a video decoder to communicate directly with an audio decoder.

FIG. 2 illustrates a flow chart for a method 200 for using interface 12 to allow the video decoder to communicate directly with the audio decoder. Such communication will allow the decoding system 100 to effect various novel functionalities by communicating commands, messages and/or data between the video decoder and the audio decoder.

Method 200 starts in step 205 and proceeds to step 210, where the video decoder sends commands, messages and/or data to the audio decoder. These commands, messages and data include, but are not limited to, timing verification and synchronization, selective control of audio output, status request, data transmission, and error detection. These commands, messages and/or data are described below.

In step 220, the audio decoder 120 will respond in accordance with the commands, messages and/or data received from the video decoder. Namely, the audio decoder may process the received data, execute a desired action, e.g., changing a time base value, and/or return a status message in accordance with the received commands and messages from the video decoder.

In step 230, method 200 queries whether a response or reply from the audio decoder is necessary in light of the received commands, messages and/or data. Depending on the specific nature of the received command and/or message, a response from the audio decoder may be expected by the video decoder. As such, if the query is negatively answered, then method 200 ends in step 250. If the query is positively answered, then method proceeds to step 240, where a response, e.g., data or message, is returned to the video decoder and then method 200 ends in step 250.

Figure 3:
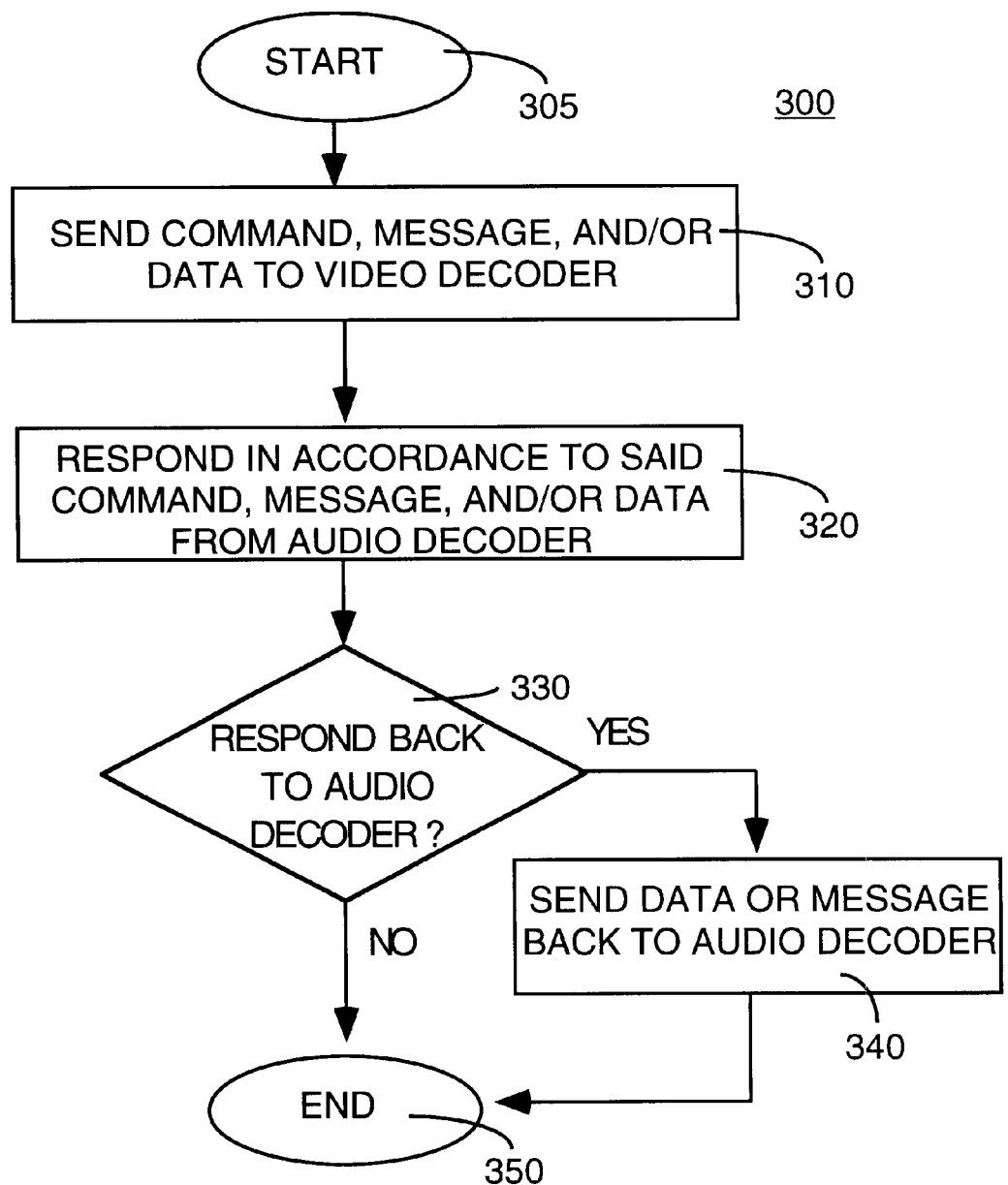
FIG. 3 depicts a flow chart for a method of using an interface to allow an audio decoder to communicate directly with a video decoder.

FIG. 3 illustrates a complementary flow chart for a method 300 for using interfaces 115a-b to allow the audio decoder to communicate directly with the video decoder. Such communication will allow the decoding system 100 to effect various novel functionalities by communicating commands, messages and/or data between the audio decoder and the video decoder.

Method 300 starts in step 305 and proceeds to step 310, where the audio decoder sends commands, messages and/or data to the video decoder. These commands, messages and data include, but are not limited to, timing verification and synchronization, selective control of audio output, status request, data transmission, and error detection. These commands, messages and/or data are described below.

In step 320, the video decoder 110 will respond in accordance with the commands, messages and/or data received from the audio decoder. Namely, the video decoder may process the received data, execute a desired action, e.g., changing a time base value, and/or return a status message in accordance with the received commands and messages from the audio decoder.

In step 330, method 300 queries whether a response or reply from the video decoder is necessary in light of the received commands, messages and/or data. Depending on the specific nature of the received command and/or message, a response from the video decoder may be expected by the audio decoder. As such, if the query is negatively answered, then method 300 ends in step 350. If the query is positively answered, then method proceeds to step 340, where a response, e.g., data or message, is returned to the audio decoder and then method 300 ends in step 350.

The above architecture of the decoding system 100 can be exploited to provide a plurality of functionalities by communicating various commands, messages and/or data between the video and audio decoders as disclosed below. Additionally, the use of a host to monitor and control an audio decoder and video decoder, respectively, is disclosed in two accompanying patent applications filed simultaneously herewith on Nov. 30, 1999 with the title "Command And Control Architecture For An Audio Decoder And A Host " (Ser. No. 09/ 449,894), and "Command And Control Architecture For A Video Decoder And A Host", (Ser. No. 09/449,897), which are hereby incorporated by reference.

Figure 5:
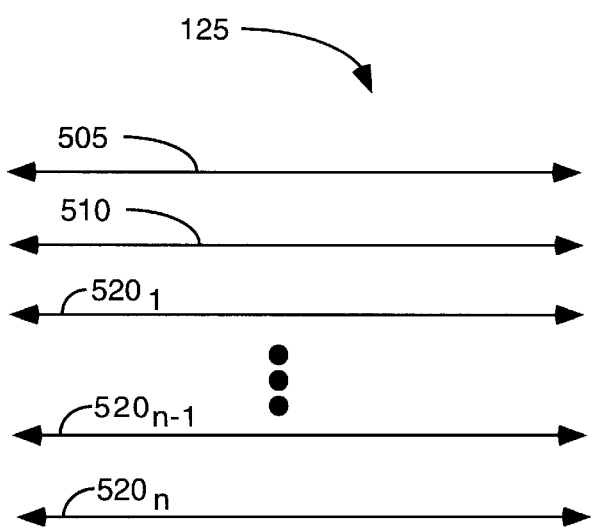
FIG. 5 illustrates an interface architecture between a video decoder and audio decoder.

FIG. 5 illustrates the interface architecture 125 between the video decoder 110 and audio decoder 120. The interface architecture 125 comprises a synchronization line 505, a status interface line 510 and a plurality of data interface lines $520_{1-n}$. In one embodiment, a synchronization line 505, the status interface line 510 and the plurality of data interface lines $520_{1-n}$ are serial interface lines. The data interface lines $520_{1-n}$ are employed to allow passage of data, e.g., PESs carrying audio data, between the video and audio decoders, whereas the status interface line 510 is employed to allow passage of commands and/or messages between the video and audio decoders. The synchronization line 505 is employed to provide a synchronization signal to effect data transfer.

It should be understood that the synchronization line 505 may actually employ one or more synchronization lines depending on the implementation of the present interface structure, i.e., one or more data interface lines may share one or more synchronization lines.

One important aspect of the present invention is the ability to employ standard data interface between the video and audio decoders while providing additional functionalities. Namely, the present invention allows the use of conventional decoders and data interfaces while providing new functionalities.

To illustrate, the ATSC specifications for digital television (A/52, A/53 and A/54) have provisions for passing multiple streams of audio information in the bitstream. This information must be parsed and the appropriate streams made available for presentation. Thus, the present interface and communication protocol between the video decoder and audio decoder are capable of handling multiple AC/3 audio streams, i.e., passing multiple streams of audio data.

Specifically, in one embodiment the data interface lines $520_{1-n}$ are Enhanced Audio Serial Interfaces (EASI). The 56362 DSP can support up to four (4) Enhanced Audio Serial Interfaces for inputting data. These. interfaces are designed to pass constant bit rate type information into the audio decoder. Each interrupt services all four interfaces (if active) and can receive up to 24 bits of information from each of the four interfaces per interrupt.

However, due to the fact that four interfaces share an interrupt, it is impossible (at the hardware level) to determine which interfaces actually have valid data. This is due to the fact that all interfaces share a single clock and frame sync signal. Therefore, it is up to the software to read in the appropriate information from the interface registers and determine if the data is valid.

The EASI interface has three modes of operation. First, "normal mode" is designed when only point to point communication is desired. In this mode, the clock pulse is used as the bit clock and the frame sync pulse is used to point to the start of a data word on the interface. In this mode of operation, both the frame sync and clock signals must be periodic, so it is up to the software to make the determination of the data received within a given frame sync period is valid.

Second, the EASI "network mode" of operation allows multiple devices to multiplex data into a single interface. For this application, the frame sync signal is used to signify the start of a network time slot, while the clock signal is the bit clock for the interface.

Third, the EASI "on-demand mode" is a special case of the network mode (where the slot size is set to a nonsense value). In this mode, the synchronization signals do not need to be periodic, and therefore the interface may be suppressed when not in use. This has advantages for bursty type data applications in that the EASI interface is not generating interrupts when there is no valid data being sent across the interface.

However, in order to use the standard EASI data interface to support multiple PES audio streams, as well as to provide support for the limitation of the EASI interface, the interface architecture 125 employs an additional status interface line 510. Using this interface architecture, the audio decoder 120 can, within the context of a given EASI interrupt, look at the status line or channel to determine which of the EASI data channels are valid. If only one PES packet is currently being transmitted, then the status interface line will inform which data interface line contains the valid data, and which stream the data is associated with. In addition, since 24 bits are being transmitted at a time, and PES packets are not necessary integer multiples of 24 bit words in length, the status information will indicate which bytes within the 24 bit word are valid.

Due to the fact that "on-demand mode" can be used for the EASI data interfaces, it is desirable to operate the interface to as high a bit rate as possible so the video decoder 110 does not overflow its buffer, e.g., 512 byte. The EASI data interface can operate at a maximum of one fourth the DSP clock frequency, which translates to 20 Mbps for the 80 Mhz 56362. It is very important at this bit rate that the EASI interface be suppressed when not in use so that the audio decoder 120 is not spending a large part of its time servicing EASI interrupts which do not carry any useful data.

Each EASI data interface between the video decoder 110 and the audio decoder 120 can pass 24 bit words into the audio decoder. In a three-channel or three-line system, data channels 0 and 1 will carry data into the audio decoder, while status channel 2 will carry control information. For the 80 Mhz version of the audio decoder, channel 1 will be ignored since there are insufficient MIPS to process multiple AC/3 streams.

For every 24 bit word on each of the EASI data interface lines, there will be a single 24 bit control word transmitted on the status interface line 510. It should be noted that other bit word lengths can be employed in the present invention. This word can be organized as follows:

| MSB | | LSB |
|---|---|---|
| XXXXXXXX | XXXXXABC | XXXXXDEF |

A=validity of MSB in data word for EASI IF #1
B=validity of middle byte in data word for EASI IF #1
C=validity of LSB in data word for EASI IF #1
D=validity of MSB in data word for EASI IF #0
E=validity of middle byte in data word for EASI IF #0
F=validity of LSB in data word for EASI IF #0
X=reserved for future use Bits that are "reserved" are for use in determining AC/3 stream number and PES stream number information for future applications that support multiple audio streams.

For PES layer support, data must be parsed into stream ID, PTS and DTS information, and AC/3 payload information. AC/3 frames must be associated with a given PTS/DTS so that the decoder can be given the frame at the proper time and the PCM output can be presented when appropriate. The AC/3 frames must then be decoded into raw audio, which must be presented at the PTS time which accompanied the original AC/3 frame.

The above described interface structure 125 can be exploited to allow multiple audio streams and to provide various new functionalities, i.e., in timing control and messaging between the video and audio decoders.

Timing Command and Messages

First, the video decoder 110 is able to issue a command or message to provide the audio decoder 120 with a clock reference, e.g., a 27 Mhz clock reference, for its local STC. The 27 Mhz clock reference is specified in accordance with the MPEG and ATSC standards. However, the actual clock reference that is passed to the audio decoder is often dependent on the capability of the audio decoder, since some audio decoders are not designed to accept such a high clock reference. This distinction is described in detail below.

Second, if the audio decoder is able to handle a high clock reference, then the audio decoder should be able to pre-scale the clock reference, e.g., the 27 Mhz clock reference, received from the video decoder down to an acceptable rate for the audio decoder, e.g., 90 kHz STC rate.

To illustrate, the 56362 (80 Mhz) contains a triple timer module which can accept an external clock source, prescale it, and interrupt the audio decoder at given time intervals based on the external clock. The maximum external frequency which can be applied is one fourth of the audio decoder's clock. For 80 Mhz, this means that an external frequency up to 20 Mhz can be applied and prescaled. While the 80 Mhz 56362 cannot accept the 27 Mhz STC, it can accept half of that rate (13.5 Mhz) and then prescale it for use as a PCM output synchronization signal. Thus, although the STC transmission frequency is 27 Mhz in the present invention, this clock is sampled down to a 90 kHz clock for presentation.

Alternatively, a 90 kHz STC can be applied directly to the time module input with no prescale for this purpose as well. Yet another alternative is to implement an audio decoder that is capable of receiving a 27 Mhz clock reference directly.

In operation, the system time clock will be maintained as a counter within the audio decoder. Small corrections needed to keep the video and audio in synchronization can be made by slightly varying the frequency of the 90 kHz input to the STC timer. DTSs and PTSs obtained from the PES stream will be compared to this timer to determine when decoding and presentation should occur. The host 130 can change the value of the STC so that PCR discontinuities (during channel or program changes) can be handled smoothly.

Figure 4:
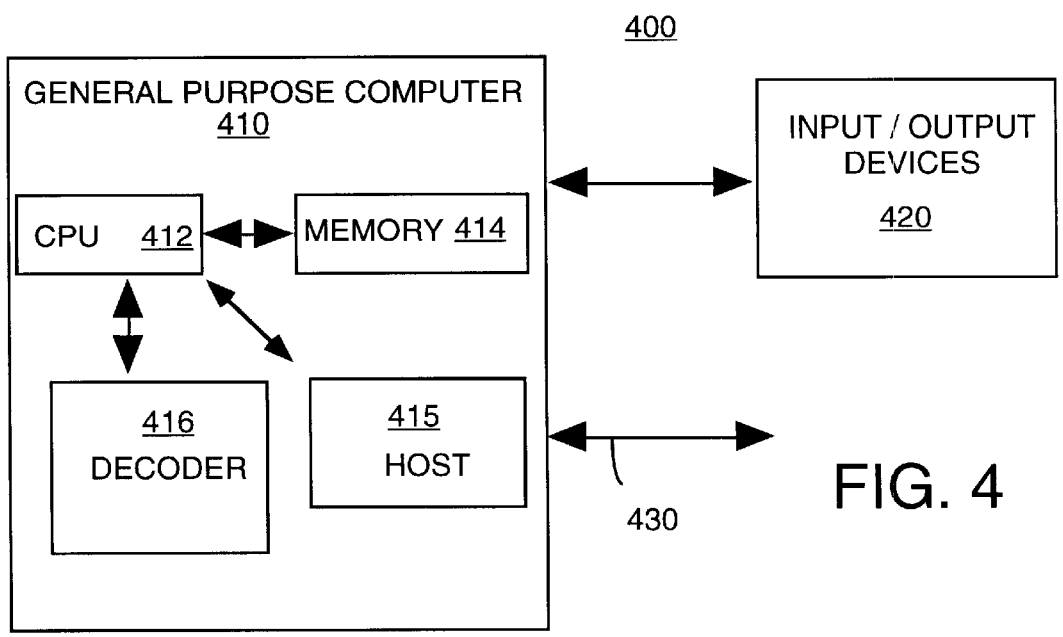
FIG. 4 illustrates a block diagram of another embodiment of the decoding system of the present invention.

FIG. 4 illustrates a decoding system 400 of the present invention. The decoding system comprises a general purpose computer 410 and various input/output devices 420. The general purpose computer comprises a central processing unit (CPU) 412, a memory 414, a host 415 and a decoder 416 for receiving and decoding a sequence of images and associated audio information.

In one embodiment, the decoder 416 is simply the video decoder 110 and/or audio decoder 120 and the host 415 is simply the host 130 as discussed above. The decoder(s) 416 and host 415 can be physical devices which are coupled to the CPU 412 through communication channels or interfaces. Alternatively, the decoder 416 and the host 415 can be represented by a software application (or a combination of software and hardware, e.g., application specific integrated circuits (ASIC)) which is loaded from a storage device and resides in the memory 412 of the computer. As such, the video decoder 110, audio decoder 120 and the host 130 of the present invention can be stored on a computer readable medium, e.g., a memory or storage device.

The computer 410 can be coupled to a plurality of input and output devices 420, such as a keyboard, a mouse, a camera, a camcorder, a video monitor, a loud speaker, stereo equipment, any number of imaging devices, audio devices or storage devices, including but not limited to, a tape drive, a floppy drive, a hard disk drive or a compact disk drive. The input devices serve to provide user inputs to the computer for producing the decoded video and audio bitstreams and/or to provide the sequence of video images and associated audio information from a storage device or an imaging device. Finally, a communication channel 430 is shown where the encoded signal is received from an encoding system (not shown).

Although various embodiments which incorporate the teachings of the present invention have been shown and described in detail herein, those skilled in the art can readily devise many other varied embodiments that still incorporate these teachings.

What is claimed is:

1. A method of communication between a video decoder and an audio decoder, said method comprising the steps of:
   (a) sending data from the video decoder to the audio decoder via at least one data interface line;
   (b) sending control data from the video decoder to the audio decoder via a status interface line; and
   (c) processing said data on said at least one data interface line in accordance with said control data by the audio decoder.

2. The method of claim 1, wherein said sending step (a) sends data having timing information.

3. The method of claim 1, wherein said sending step (a) sends data via at least one serial data interface line.

4. The method of claim 3, wherein said sending step (a) sends data via at least one enhanced audio serial interface (EASI) data interface line.

5. A method of communication between a video decoder and an audio decoder, said method comprising the steps of:
   (a) sending data from the audio decoder to the video decoder via at least one data interface line;
   (b) sending control data from the audio decoder to the video decoder via a status interface line; and
   (c) processing said data on said at least one data interface line in accordance with said control data by the video decoder.

6. The method of claim 5, wherein said sending step (a) sends data having timing information.

7. The method of claim 5, wherein said sending step (a) sends data via at least one serial data interface line.

8. The method of claim 7, wherein said sending step (a) sends data via at least one enhanced audio serial interface (EASI) data interface line.

9. A computer-readable medium having stored thereon a plurality of instructions, the plurality of instructions including instructions which, when executed by a processor, cause the processor to perform the steps comprising of:
   (a) sending data from the video decoder to the audio decoder via at least one data interface line;
   (b) sending control data from the video decoder to the audio decoder via a status interface line; and
   (c) processing said data on said at least one data interface line in accordance with said control data by the audio decoder.

10. The computer-readable medium of claim 9, wherein said sending step (a) sends data having timing information.

11. The computer-readable medium of claim 9, wherein said sending step (a) sends data via at least one serial data interface line.

12. The computer-readable medium of claim 11, wherein said sending step (a) sends data via at least one enhanced audio serial interface (EASI) data interface line.

13. A computer-readable medium having stored thereon a plurality of instructions, the plurality of instructions including instructions which, when executed by a processor, cause the processor to perform the steps comprising of:
   (a) sending data from the audio decoder to the video decoder via at east one data interface line;
   (b) sending control data from the audio decoder to the video decoder via a status interface line; and
   (c) processing said data on said at least one data interface line in accordance with said control data by the video decoder.

14. The computer-readable medium of claim 13, wherein said sending step (a) sends data having timing information.

15. The computer-readable medium of claim 13, wherein said sending step (a) sends data via at least one serial data interface line.

16. The computer-readable medium of claim 15, wherein said sending step (a) sends data via at least one enhanced audio serial interface (EASI) data interface line.

17. A decoding system comprising:
   a video decoder;
   an audio decoder; and
   an interface structure disposed between said video decoder and said audio decoder, said interface structure having a status interface line for passage of control data and a plurality of data interface lines for passage of data.

* * * * *